May 4, 1937.  C. R. KENNEY  2,079,215
RAKER TOOTH GAUGE
Filed March 13, 1936
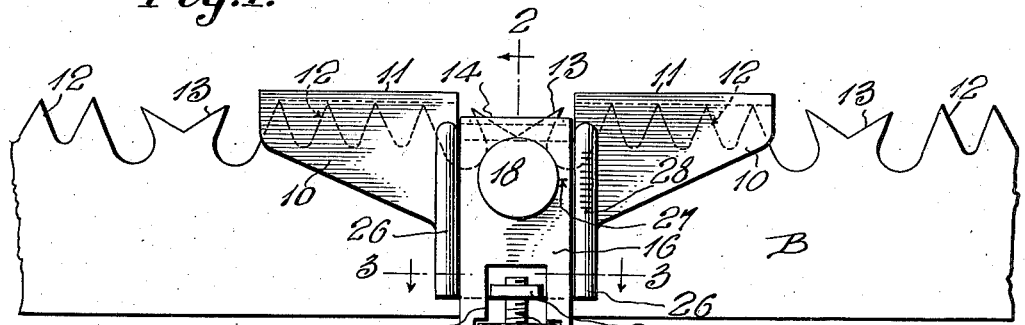
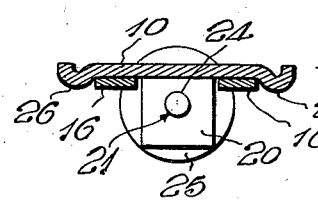
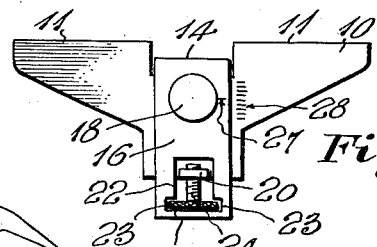
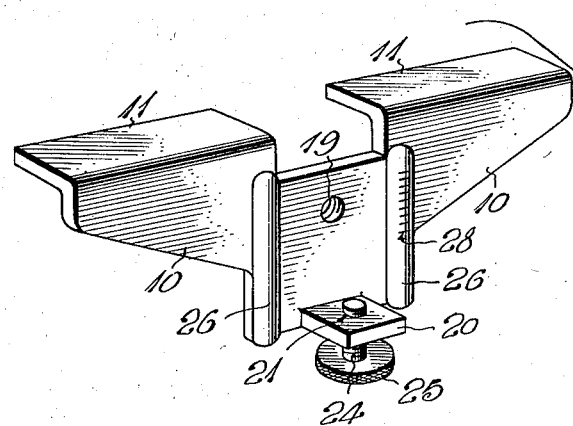
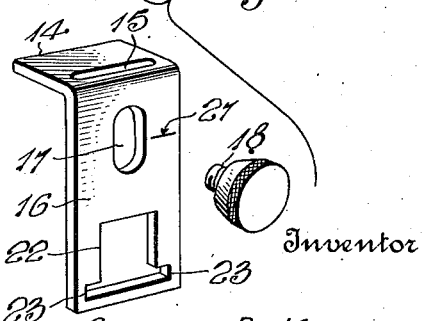
Witness
H. Woodard
Inventor
CHARLES R. KENNEY
By H. B. Willson &co
Attorneys.

Patented May 4, 1937

2,079,215

UNITED STATES PATENT OFFICE 2,079,215

RAKER-TOOTH GAUGE

Charles R. Kenney, Brewer, Maine

Application March 13, 1936, Serial No. 68,760

1 Claim. (Cl. 33—202)

The invention relates to gauges used for filing the raker teeth of cross-cut saws to proper length, according to the kind of wood to be sawed or the extent (if any) to which it has been seasoned.

The gauge is of the general type having a plate to lie vertically against a saw blade, longitudinally spaced lateral flanges on the upper edge of said plate to rest on the cutting teeth of the blade, a raker-tooth gauge between said flanges, a flat slide carrying said gauge and lying against said plate, said slide being provided with a vertical slot, a clamping screw threaded through said slot and threaded into an opening in said plate, and screw-threaded means for vertically adjusting the slide.

It is the principal object of the invention to provide a new and improved construction establishing a novel adjustable connection between the lower end of the plate and the lower end of the slide, including a manually actuated adjusting screw threaded through an opening in a lug projecting from the plate, said slide having a second slot through which said lug passes, said second slot having a widened end receiving the head of the adjusting screw in such manner that rotation of this screw to adjust it upwardly or downwardly, will cause its head to similarly adjust the slide.

Another object of the invention is to provide a construction which may be easily and inexpensively stamped (with the exception of the adjusting and clamping screws) from flat sheet metal.

A still further object is to provide a gauge which may be easily and inexpensively manufactured and sold at small cost, yet will be efficient and durable.

With the foregoing in view, the invention resides in the novel subject matter hereinafter described and claimed, description being accomplished by reference to the accompanying drawing.

Fig. 1 is a side elevation of the gauge in use.

Fig. 2 is a vertical sectional view on line 2—2 of Fig. 1.

Fig. 3 is a horizontal sectional view on line 3—3 of Fig. 1.

Fig. 4 is a disassembled perspective view.

Fig. 5 is a side elevation showing a slight modification.

In the drawing above briefly described, 10 denotes a suitably shaped flat plate to lie against one side of a saw blade B, the upper edge of said plate being provided with two longitudinally spaced flanges 11 to lie upon the cutting teeth 12 of the blade at opposite sides of its raker teeth 13. A raker-tooth gauge 14 having a tooth-receiving slot 15 occupies the space between the flanges 11 and is carried by a flat vertical slide 16 which lies against the outer side of the plate 10. The upper portion of the slide 16 is formed with a vertical slot 17 through which a clamping screw 18 passes, said clamping screw being threaded into an opening 19 in the plate 10.

The lower end of plate 10 is provided with a lateral lug 20 disposed centrally below the space between the flanges 11 and projecting in the opposite direction from said flanges, said lug being formed with a threaded opening 21. The lower end portion of the slide 16 is provided with a second vertical slot 22 through which the lug 20 passes, the lower end of this slot being widened, preferably by forming notches 23 in the parallel vertical edges of the slot, with the lower edges of said notches flush with the lower end wall of the slot. An adjusting screw 24 is threaded vertically through the opening 21 of the lug 20, said adjusting screw being provided with a flat head 25 at its lower end. This head is received in the notches 23, causing upward or downward adjustment of the screw 24 to similarly adjust the slide 16. Thus, with the clamping screw 18 loosened, accurate adjustment of the slide 16 to locate the gauge 14 at the proper level, may be quickly and easily accomplished, the adjusted slide being then locked by tightening of said screw 18.

For vertically guiding the lower portion of the slide 16, the lug 20 and the parallel vertical edges of the slot 22 may be relied upon as shown in Fig. 5, but if desired, guiding ribs 26 may be formed on the plate 10 as seen in Figs. 1 to 4.

Preferably, an indicating mark 27 is provided on the slide 16 for coaction with a plurality of such marks 28 on the plate 10, to allow accurate adjustment of the gauge, and when the ribs 26 are employed, the marks 28 may well be formed on one of these ribs.

I prefer to form the entire plate 10 with its lug 20 and with the ribs 26 (when the latter are employed) from a single sheet metal plate cut and stamped to the necessary configuration. Similarly, I prefer to form the slide 16 and its gauge 14 from a single metal stamping. This stamping is of harder metal than the stamping from which the plate 10 is formed, to resist the action of the file used for dressing the raker teeth 13, and a portion of it may, if desired, be tempered.

It will be seen from the foregoing that an unusually simple and inexpensive, quickly and easily adjustable, efficient and durable gauge has been provided. While the exact structure disclosed may be considered as preferred, minor variations may of course be made within the scope of the invention as claimed.

I claim:

A raker-tooth gauge comprising a plate to lie vertically against a saw blade and having flanges to rest on the cutting teeth, a flat slide lying vertically against said plate and having a raker-tooth gauge between said flanges, the lower portion of said slide being provided with a vertical slot having a widened end, said plate being provided with a lateral lug which passes through said slot, said lug being formed with a threaded opening, a vertical adjusting screw threaded through said opening, said screw having a flat operating head received in said widened slot end, whereby normal rotation of said screw will cause vertical movement of said slide, and a screw-and-slot-connection between the upper portion of said slide and said plate.

CHARLES R. KENNEY.